United States Patent [19]

Kim et al.

[11] Patent Number: 4,799,270

[45] Date of Patent: Jan. 17, 1989

[54] IMAGE CLASSIFIER

[75] Inventors: Boris F. Kim, Laurel; Joseph Bohandy, Columbia, both of Md.

[73] Assignee: The Johns Hopkins University, Baltimore, Md.

[21] Appl. No.: 841,658

[22] Filed: Mar. 20, 1986

[51] Int. Cl.[4] .............................................. G06K 9/62
[52] U.S. Cl. ........................................ 382/27; 382/37
[58] Field of Search ...................... 382/14, 15, 27, 34, 382/37, 38

[56] References Cited

FOREIGN PATENT DOCUMENTS 1192554 5/1970 United Kingdom ................. 382/14

Primary Examiner—Leo H. Boudreau
Attorney, Agent, or Firm—Robert E. Archibald; Mary L. Beall

[57] ABSTRACT

A hierarchical and recursive system for classifying, identifying, describing and analyzing images and the related apparatus are disclosed wherein a digital image is partitioned into subarrays, the content of each subarray is compared to memory elements stored within memory, and if a match occurs, the name of the matched memory element is assigned to the subarray. When all subarrays have been named, a symbolic image whose pixel elements are the assigned names, is formed which is the image for the next level of identification. If no match occurs, a new memory element and appropriate corresponding name are created and added to the memory stack.

13 Claims, 3 Drawing Sheets

IMAGE CLASSIFIER

STATEMENT OF GOVERNMENTAL INTEREST

The Government has rights in this invention pursuant to Contract No. N00024-85-C-5301, awarded by the Department of the Navy.

BACKGROUND OF THE INVENTION

This invention relates to an imaging system and related apparatus. An imaging system is one which has the ability to classify, identify, describe and/or analyze images.

An imaging system can be conceptualized as consisting of three components: an image acquisition component, a memory, and an inferential component that uses the memory to produce an interpretation of the image. Although the image acquisition component is generally straight forward in design and implementation, it has been exceeding difficult to synthesize systems of memory and inference that result in a useful imaging system. Despite a broad range of approaches to the solution of these problems, ranging from simple template matching to main stream artificial intelligence techniques, no imaging system has been devised that can approach the capabilities of the human vision system.

A pattern discrimination method is disclosed in U.S. Pat. No. 4,451,929 issued to Hajime Yoshida. In this patent, if the difference between the data from an object to be inspected and previously memorized data of a standard subject falls within a predetermined value, the object belongs to the same kind of standard subject. A similar U.S. Pat. No. 4,449,240 was issued to the same inventor.

In U.S. Pat. No. 4,521,909 issued to Patrick S. Wang, a pattern recognition system having both coarse and fine levels of analysis, is used to identify a work piece pattern. This pattern recognition system has a learning system in which a representation of a work piece pattern maybe incorporated into the memory.

U.S. Pat. No. 3,873,972 issued to Theodore H. Levine, relates to a character recognition system based on sequence characterization. This system also contains a learning mode.

In a patent issued to Bruce S. Buckley, U.S. Pat. No. 4,479,241, an automatic pattern recognition system is disclosed mimicking the neuron signal from the human brain.

U.S. Pat. No. 4,541,115 issued to Larry J. Werth, discloses a pattern processing system based on address sequencing. This system stores the image in the form of a binary pattern.

The need to create computer vision technology that can learn to interpret images from experience is a concept emphasized by R. M. Haralick and J. R. Ullmann, in "A Report on the 1982 IEEE Computer Vision Workshop" Pros. Workshop on Computer Vision, Representation and Control, VII–XIII, (1984).

Additional references are:

D. Marr, *Vision*, W. H. Freeman and Co., New York (1982).

H. G. Barrow and J. M. Tenenbaum, "Computational Vision", in *Proc IEEE* 69, pp. 572–595 (1981).

A. R. Hanson and E. M. Riseman, "VISIONS: A Computer System for Interpreting Scenes", in *Computer Vision Systems*, A. R. Hanson and E. M. Riseman, eds., Academic Press, New York (1978).

R. A. Brooks, R. Greiner, and T. 0. Binford, "The ACRONYM Model-Based Vision System", in *Proc. OJCAI* 6, Tokyo, pp. 105–113 (1979).

A. Rosenfeld, "Parallel Image Processing Using Cellular Arrays", *IEEE Comput. Mag.*, 14–20 (1983).

Winston, Henry and Horn, Berthold Klaus Paul, *LISP*, Addison-Wesley Publishing Co., 1981.

Foderaro, Solink, and Sklower, Keith L., *The FRANZ LISP MANUAL*, University of California, 1981.

*Multisensor Data Fusion Involving Imagery*, 14th Workshop on Applied Imagery Pattern Recognition; Oct. 3–4, 1985; IEEE Computer Society.

SUMMARY OF THE INVENTION

It is an object of the present invention to provide a hierarchical and recursive computer system able to classify, identify or analyze images and objects. "Image" is understood to encompass classical visual images as well as generalized images such as fused source images and those composed of the outputs of multiple sensory devices and time based sensory devices.

Another object of the present invention is to provide a machine vision system wherein the system learns to recognize images, shapes or objects from experience. The speed of recognition of particular images depends on when the image was last encountered; images of objects encountered most recently are more quickly recognized. If certain images are not regularly used, the system may "forget" them.

DESCRIPTION OF THE INVENTION

In the image classifier system according to the present application, a hierarchy of symbolic images of monotonically decreasing sizes is generated, with the last image yielding an interpretation of the original image. At each hierarchical level, the symbolic image is interpreted by comparison with the elements of the memory associated with that level and a new image is generated for interpretation recursively at the next level.

At the last level, the original image is classified, described or identified. The word "classification" is understood to mean providing the class of the object or image. For example, the letter "T" is classified in the class named "letter". If the image is to be identified, its "identification" is "T". A "description" of "T" is made by referring to the intersection vertical and horizontal lines.

At any given hiearchical level, the image is partitioned into an array of subarrays. The content of each subarray is then compared with elements in a memory for that level. A unique symbol, called the "name" of the memory element, is associated with each memory element. If the content of a subarray matches a particular memory element, the name of the element is assigned to that subarray. Each subarray in the image is interpreted in this manner, the assigned names together forming a symbolic image at this level. This new symbolic image is then interpreted recursively at the next hierarchical level. At the last level, the name of each memory element is a classification, description or other identification of the object or pattern in the original image.

Figure 1:
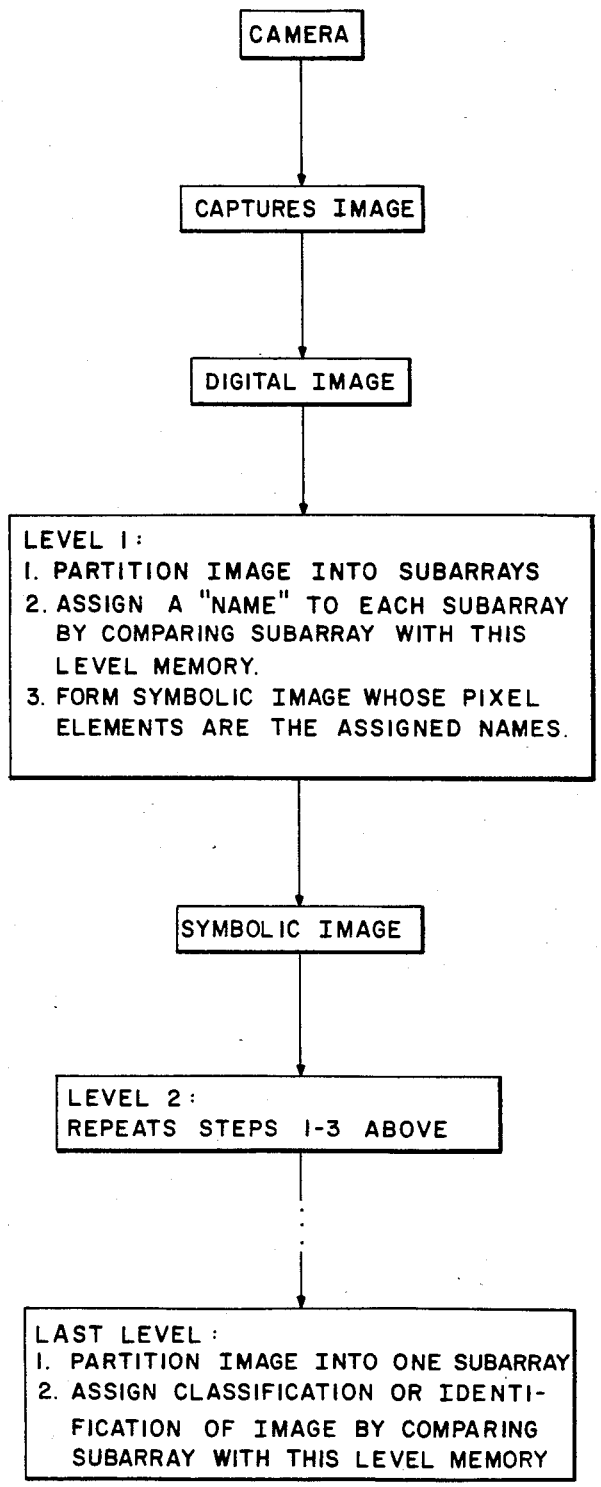
FIG. 1 is a block diagram demonstrating the machine vision system of the present invention.

This basic system is shown in FIG. 1. A camera captures an image which is electronically processed to produce a digital image consisting of pixel units. At level 1, the image is partitioned into subarrays made up of contiguous or adjacent pixels. Then, the content of each subarray is compared with the memory elements of this level. The name of the memory element which matches the content of the subarray is assigned to the subarray and the assigned names of respective subarrays are used to form a symbolic image whose pixel elements are these assigned names.

At level 2, the symbolic image is divided into subarrays. As in level 1, a name is assigned to each subarray by comparing the content of each subarray with the memory elements of the level 2 memory. These names are used to form a symbolio image for the next level of identification. In other words, the same basic steps shown in level 1 of partitioning, comparing and assigning a name, and forming a symbolic image are performed. Thus, level 2 and any succeeding levels of identification operate recursively.

In the last level of identification, the symbolic image from the preceding level of identification is a single subarray and, the name assigned is the classification, identification or other description of the original image acquired by the camera.

Figure 2:
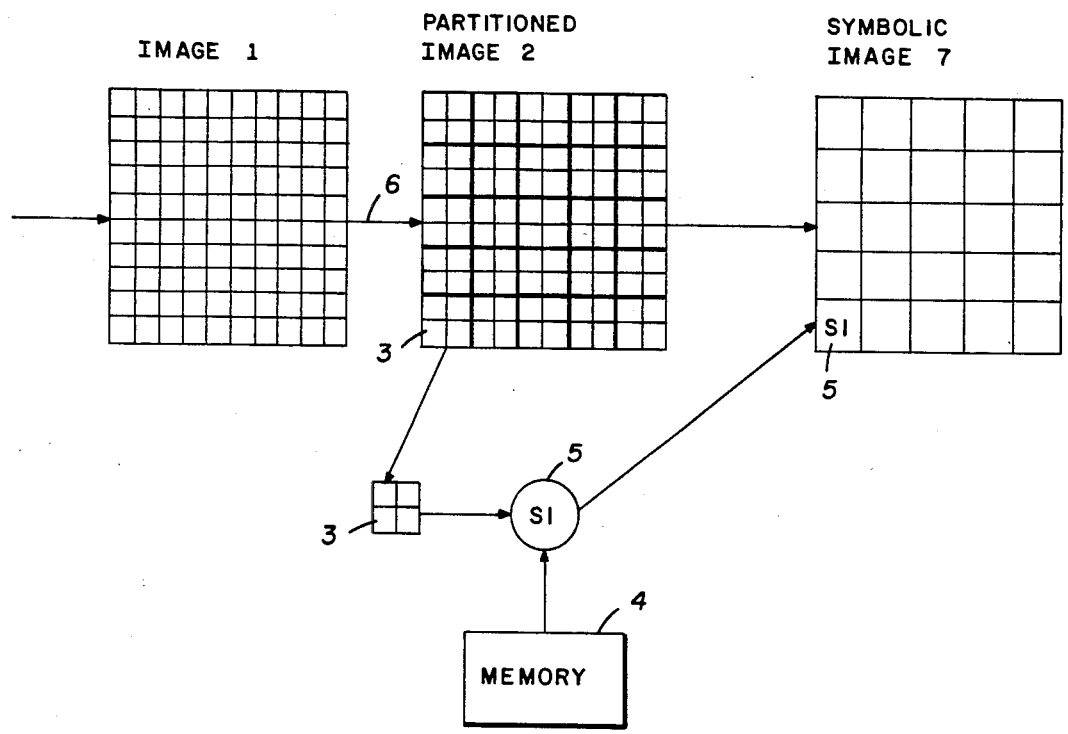
FIG. 2 is a diagram demonstrating two adjacent levels of identification.

The recursively repeated steps according to the system of the present invention, are demonstrated in more detail referring to FIG. 2. A camera acquires image 1 which is electronically processed at 6 to produce partitioned image 2 divided into a plurality of subarrays 3. The content of each subarray 3 is compared with the content of memory elements stored within memory 4. If a match occurs, subarray 3 is assigned the name of the matching memory element, in this case "S1", shown at 5. Each subarray 3 in the partitioned image 2 is compared with memory 4 in turn. When names have been assigned to all subarrays, a symbolic image 7 is formed which is the image for the next level of identification.

Memory 4 is a member of a hierarchy and at each level consists of a separate stack of memory elements which are compared sequentially with subarrays at that same level. When a match is found, the memory element which was successfully matched is placed at the top of the stack. If no match is achieved, then a memory element matching the subarray is created, assigned a unique name or symbol and is placed at the top of the memory stack. Since the number of the memory elements is constant, when a new memory element is added, the last element in the stack is discarded. In this way, the object or image that the system most quickly recognizes is that which it has seen most recently. Also, the system may forget or lose its ability to recognize objects which are not reinforced by usage. When the system first begins service, the content of the memory elements is initiated as zero and no names exist. By presenting the system with images or patterns of the type the system is expected to identify or classify, some of these elements are assigned values, for example, as shown at 14 of FIG. 3. At the same time, the unique name 5 is assigned to the element.

Figure 3:
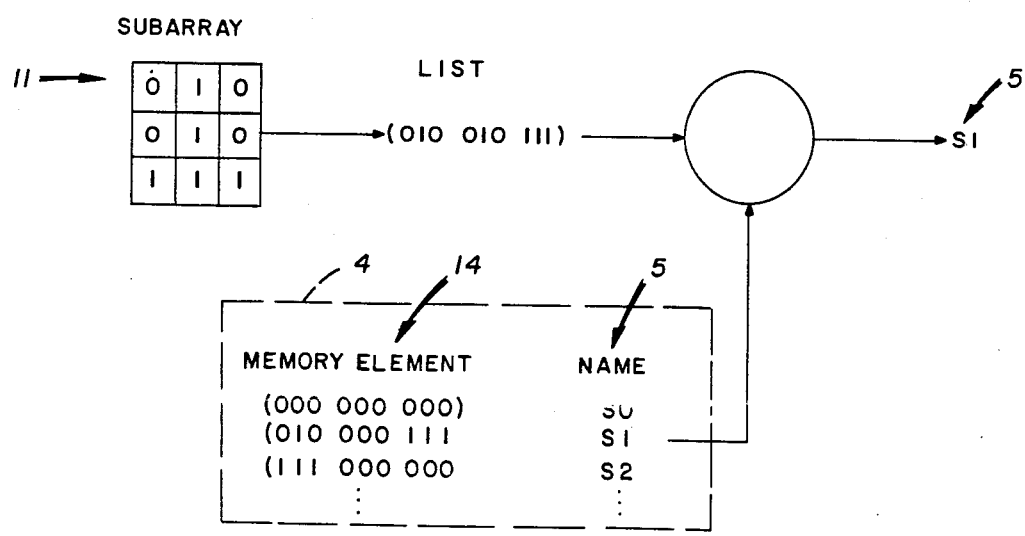
FIG. 3 is a diagram demonstrating matching the content of a subarray with memory.

Referring to FIG. 3, each memory element 14 in memory 4, is a list of symbols equal in length to the number of pixels of each subarray 11. A matching function converts the subarrays into lists which are compared directly with memory elements 14. Although FIG. 3 indicates an exact match between a subarray and a memory element, an exact match requirement may not be advantageous in all cases. A partial match in the first level would alleviate noise problems in interpretations at that level.

A main benefit is that the system requires fewer memory bits than does a system which stores entire images. The savings in memory results because the same subarray pattern can occur within the same image or in several different images.

Figure 4:
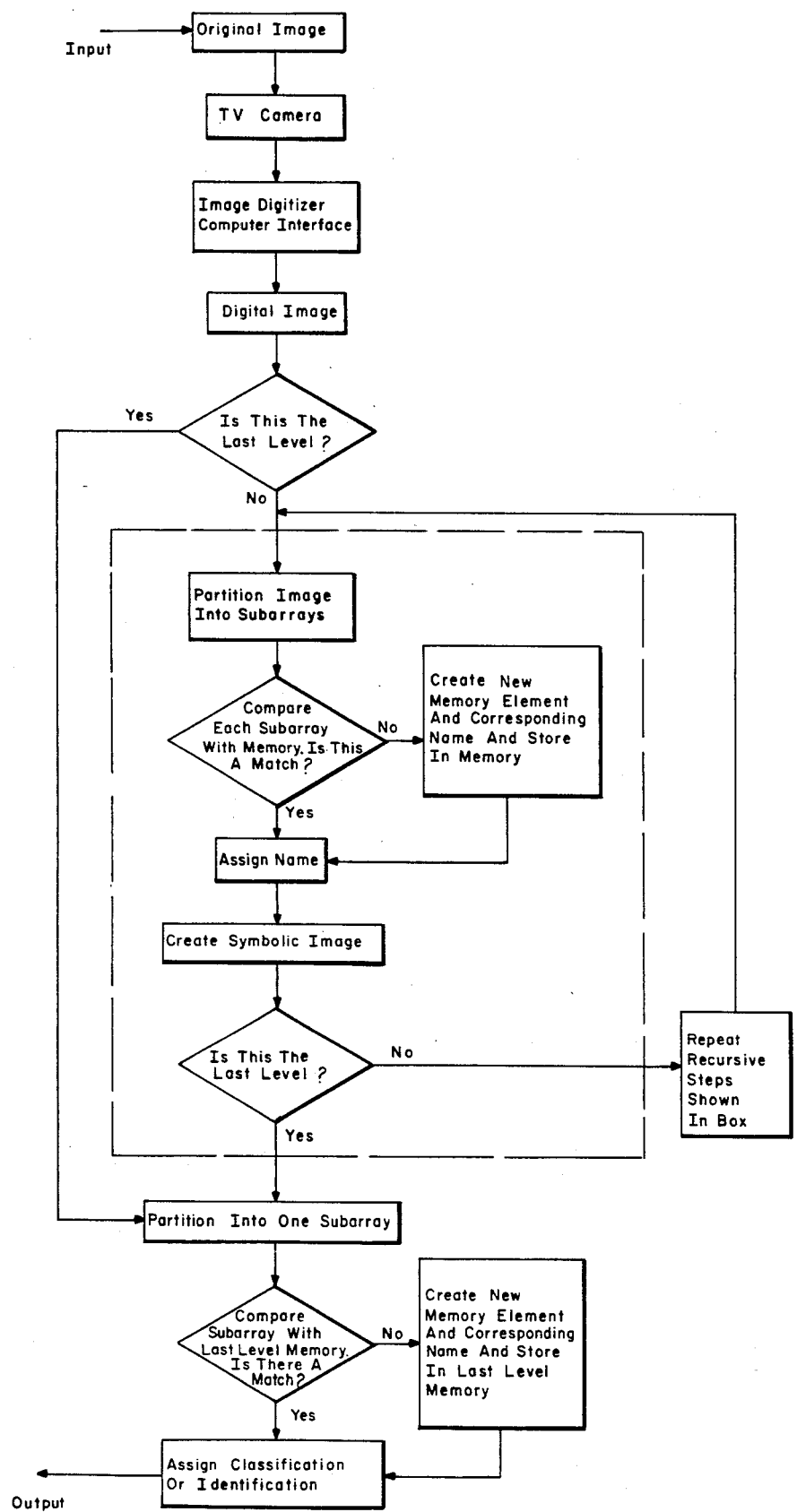
FIG. 4 is a software diagram.

The software diagram shown in FIG. 4 provides a detailed flow chart of the system and apparatus of the present invention. A TV camera acquires the original image, which is electronically processed by the image digitizer and computer interface to produce a digital image. If there is more than one level of identification, the image is partitioned into subarrays and the content of each subarray is compared with the memory for that particular level. If there is a match, then the previously described steps occur in the order shown. If there is no match, a new memory element and its corresponding name are created and added to the top of the memory stack for that level. Then, if the memory stack is full, the last memory element at the bottom of the stack is discarded. The newly created name is assigned to the subarray and is used to create a pixel element in the symbolic image for the next level of identification. Since the system can be adapted to use several levels of identification, each level operates recursively using the steps shown in the dotted line box. Only the last level of identification does not use these recursive steps.

A presently operating system as described herein has been implemented in a FRANZ LISP program used in a Digital Equipment Corporation VAX 11/780 computer. Another example of an operating system uses any one of a known number of television video cameras (RS-170) in conjunction with an image digitizer and computer interface such as the FG-100 Real Time Video Digitizer Module available from Imaging Technology, Inc., a Sun Model 3/160 computer with a Unix Operating System. If needed, a Digital Equipment Corporation Model VT-220 Terminal is suitable.

The image classifier system of the present invention is very flexible. All the details relating to specific object or image configuration are specified outside the text of the program. These details specifically are: the size (number of pixels) of the image field; the number of levels of identification; the partition of the images into subarrays at each level and the size and structure of the hierarchical memory. These details are global variables and are set before operating the system. In this way, the size of the system can be changed without changing the text of the source program. Thus, the program can be optimized for different types of image or object classification applications.

It is understood that the invention is not limited to these precise embodiments and that various changes and modifications may be made by one skilled in the art without departing from the scope or spirit of the present invention.

What is claimed is:

1. An imaging system comprising:
   a. providing an image;
   b. electronically processing the image to produce a digital image;

c. at least one level of identification, partitioning the image from the previous step into subarrays;

d. comparing the content of each subarray with memory elements of that level of identification;

e. assigning a symbol to each subarray, said symbol being the symbol of the memory element matching the content of the subarray, wherein the assigned symbol is a pixel element in a symbolic image for the next level;

f. repeating step e. until all subarrays have assigned symbols;

g. forming the symbolic image from the assigned symbols;

h. repeating recursively steps c. through g. until all levels of identification have been completed;

i. as a last level, forming a single subarray of pixel elements of the symbolic image formed in the preceding level;

j. comparing the content of the single subarray with the memory elements of the last level; and, k. assigning a name to the subarray, said name being the name of the memory element in the last level matching the content of the single subarray and naming the image of step a.

2. The system according to claim 1, wherein the digital image consists of pixel elements and the subarray in step c. contains at least two contiguous pixel elements.

3. A system according to claim 1, wherein memory elements for each level are stored in memory in a memory stack for that level, the number of memory elements in the stack for each level being constant.

4. An imaging system comprising:
a. providing an image;
b. electronically processing the image to produce a digital image;
c. at least one level of identification, partitioning the image from the previous step into subarrays;
d. comparing the content of each subarray with memory elements of that level of identification;
e. assigning a symbol to subarray, said symbol being one of the symbol of the memory element matching the content of the subarray and a new symbol created if there is no matching memory element, said new symbol identifying a new memory element representing the content of the subarray, wherein the assigned symbol is a pixel element in a symbolic image for the next level;
f. repeating step e. until all subarrays have assigned symbols.
g. forming the symbolic image from the assigned symbols;
h. repeating recursively steps c. through g. until all levels of identification have been completed;
i. as a last level forming a single subarray of the pixel elements of the symbolic image formed in the preceding level;
j. comparing the content of the single subarray with memory elements of the last level; and,
k. assigning a name to the subarray, said name being one of the name of the memory element of the last level matching the content of the subarray and a new name created if there is no matching memory element, said new name identifying a new memory element representing the content of the subarray and naming the image of step a.

5. A system according to claim 3, wherein memory elements for each level and their respective symbols and names are stored in memory in a memory stack for that level, the number of memory elements in the stack for each level being constant.

6. A system according to claim 5, wherein, if there is no matching memory element, the new memory element is placed at the top of the stack and, if the stack if full, the memory element at the bottom thereof is discarded.

7. An imaging apparatus comprising:
image producing means comprising an image digitizer and computer interface forming a digital image;
at least a first level identification means comprising:
a. means partitioning the image into subarrays;
b. memory means comprising a stack of memory elements for each level of identification;
c. means comparing the content of each of said subarrays with said memory elements;
d. means assigning a symbol to each subarray, said symbol being the symbol of the memory element matching the content of the subarray;
e. means creating a symbolic image from the assigned symbols;
means repeating steps a. through e. recursively until all levels of indentification have been completed; and,
a last level comprising;
a. means partitioning the symbolic image from the previous level into a single subarray;
b. memory means comprising a stack of memory elements for the last level;
c. means comparing the content of said single subarray with said last level memory elements; and
d. means assigning a name to the single subarray, said name being the name of the memory element in the last level matching the content of the single subarray and providing the name of the digital image.

8. An imaging apparatus comprising:
image producing means comprising an image digitizer and computer interface forming a digital image;
at least a first level identification means comprising:
a. means partitioning the image into subarrays;
b. memory means comprising a stack of memory elements for each level of identification;
c. means comparing the content of each of said subarrays with said memory elements;
d. means assigning a symbol to each subarray, said symbol being one of the symbol of the memory element matching the content of the subarray and a new symbol created if there is no matching memory element, said new symbol identifying a new memory element representing the content of the subarray;
e. means adding the new memory element and the new symbol to the stack of the memory elements;
f. means creating a symbolic image from the assigned symbols;
means repeating steps a. through e. recursively until all levels of identification have been completed;
a last level means comprising:
a. means partitioning the symbolic image from the previous level into a single subarray;
b. memory means comprising a stack of memory elements for the last level;
c. means comparing the content of said single subarray with said last level memory elements; and
d. means assigning a name to the single subarray, said name being one of the name of the memory element in the last level matching the content of the single subarray and a new name created if there is no matching memory element, said new name identifying a new memory element representing the content of the subarray, and naming the digital image.

9. An apparatus according to claim 8, wherein the number of memory elements in each stack is constant and further wherein, if there is no matching memory element, means placing the new memory element at the top of the stack and, if the stack is full, means discarding the memory element at the bottom thereof.

10. The system according to claim 1, wherein a single memory element matches the content of a subarray found at the same level of identification in several different digital images.

11. The system according to claim 4, wherein a single memory element matches the content of a subarray found at the same level of indentification in several different digital images.

12. An imaging system comprising:
  a. providing an image;
  b. electronically processing the image to produce a digital image;
  c. at a first level of identification, partitioning the image from the previous step into subarrays;
  d. comparing the content of each subarray with memory elements of said first level of identification;
  e. assigning a symbol to each subarray, said symbol being the symbol of the memory element matching the content of the subarray, wherein the assigned symbol is a pixel element in a symbolic image for a next level of identification;
  f. repeating step e. until all subarrays have assigned symbols;
  g. forming the symbolic image from the assigned symbols;
  h. partitioning the symbolic image from g. into subarrays for the next level of identification;
  i. comparing the content of each subarray with memory elements of the next level of identification;
  j. assigning a symbol to each subarray, said symbol being the symbol of the memory element matching the content of the subarray, wherein the assigned symbol is a pixel element in a symbolic image for a next level;
  k. repeating step j. until all subarrays have assigned symbols;
  l. repeating recursively steps g. through k. until all levels of identification have been completed;
  m. as a last level, forming a single subarray of pixel elements of the symbolic image formed in the preceding level;
  n. comparing the content of the single subarray with the memory elements of the last level; and,
  o. assigning a name to the subarray, said name being the name of the memory element in the last level matching the content of the single subarray and naming the image of step a.

13. An imaging system comprising:
  a. providing an image;
  b. electronically processing the image to produce a digital image;
  c. at a first level of identification, partitioning the image from the previous step into subarrays;
  d. comparing the content of each subarray with memory elements of said first level of identification;
  e. assigning a symbol to each subarray, said symbol being one of the symbol to the memory element matching the content of the subarray and a new symbol created if there is no matching memory element, said new symbol identifying a new memory element representing the content of the subarray, wherein the assigned symbol is a pixel element in a symbolic image for a level of identification;
  f. repeating step e. until all subarrays have assigned symbols;
  g. forming the symbolic image from the assigned symbols;
  h. partitioning the symbolic image from g. into subarrays for the next level of identification;
  i. comparing the content of each subarray with memory elements of the next level of identification;
  j. assigning a symbol to each subarray, said symbol being one of the content of the subarray and a new symbol created if there is no matching memory element, said new symbol identifying anew memory element representing the content of the subarray, wherein the assigned symbol is a pixel element in a symbolic image for a next level;
  k. repeating step j. until all levels of identification have been completed;
  l. repeating recursively steps g. through k. until all levels of identification have been completed;
  m. as a last level, forming a single subarray of pixel elements of the symbolic image formed in the preceding level;
  n. comparing the content of the single subarray with the memory elements of the last level; and,
  o. assigning a name to the subarray, said name being one of the name of the memory element of the last level matching the content of the subarray and a new name created if there is no matching memory element, said new name identifying a new memory element representing the content of the subarray and naming the image of step a.

* * * * *

UNITED STATES PATENT AND TRADEMARK OFFICE
CERTIFICATE OF CORRECTION

PATENT NO. :   4,799,270
DATED      :   January 17, 1989
INVENTOR(S) :  Kim et al.

It is certified that error appears in the above—identified patent and that said Letters Patent is hereby corrected as shown below:

Column 5, line 40, after "symbol to" insert -- each --.

Column 6, line 5, delete second occurrence of "if" and substitute therefore -- is --.

Signed and Sealed this

Twenty-second Day of August, 1989

Attest:

DONALD J. QUIGG

*Attesting Officer*        *Commissioner of Patents and Trademarks*